United States Patent
De Bruijn et al.

(10) Patent No.: US 12,473,238 B2
(45) Date of Patent: Nov. 18, 2025

(54) METHOD AND SYSTEM FOR PROVIDING PLANTS WITH WATER COMPRISING A HIGH NITRATE CONTENT

(71) Applicants: Van der Knaap Diensten B.V., Kwintsheul (NL); Triqua International B.V., Ede (NL)

(72) Inventors: Carolus Wilhelmus Maria De Bruijn, Monster (NL); Arnaud Marinus Aart Duine, Wageningen (NL)

(73) Assignees: Van der Knaap Diensten B.V., Kwintsheul (NL); Triqua International B.V., Ede (NL)

( * ) Notice: Subject to any disclaimer, the term of this patent is extended or adjusted under 35 U.S.C. 154(b) by 951 days.

(21) Appl. No.: 17/434,151

(22) PCT Filed: Mar. 11, 2020

(86) PCT No.: PCT/EP2020/056562
§ 371 (c)(1),
(2) Date: Aug. 26, 2021

(87) PCT Pub. No.: WO2020/182913
PCT Pub. Date: Sep. 17, 2020

(65) Prior Publication Data
US 2022/0162132 A1     May 26, 2022

(30) Foreign Application Priority Data
Mar. 12, 2019 (NL) .................................. 2022724

(51) Int. Cl.
*C05C 5/00* (2006.01)
*C05F 17/20* (2020.01)
*C05F 17/40* (2020.01)

(52) U.S. Cl.
CPC ................ *C05C 5/00* (2013.01); *C05F 17/20* (2020.01); *C05F 17/40* (2020.01)

(58) Field of Classification Search
CPC ... C05C 5/00; C05C 1/00; C05F 17/20; C05F 17/40; Y02A 40/20; Y02P 20/145; Y02W 30/40
See application file for complete search history.

(56) References Cited

U.S. PATENT DOCUMENTS 2,366,917 A * 1/1945 Levine ................... C02F 3/121
                                          210/151
5,656,059 A * 8/1997 Monster ................... C05F 3/00
                                             71/7

(Continued)

FOREIGN PATENT DOCUMENTS

EP     2333046 A1    6/2011
EP     2333057 A1    6/2011

(Continued)

OTHER PUBLICATIONS

SchoolAR Chemistry. "MSDS # 377.10 ; Iron (III) Nitrate 0.2M" Chemtrec (USA) <https://www.mccsd.net/cms/lib/NY02208580/Centricity/Shared/Material%20Safety%20Data%20Sheets%20_MSDS_/MSDS%20Sheets_Iron_III_Nitrate_0_2M_377_10.pdf>Jan. 23, 2009 (Year: 2009).*

(Continued)

*Primary Examiner* — Jennifer A Smith
(74) *Attorney, Agent, or Firm* — Christian S. Hans; Bret E. Field; Bozicevic, Field & Francis LLP (57) ABSTRACT

The present invention relates to a method for producing water having a stable high nitrate content, an organic fertilizer comprising the water having a stable high nitrate content thus produced, and use of the water having a stable high nitrate content in a method for the organic cultivating of a plant in a substrate. The present invention further relates (Continued)

to a continuous flow system for supplying plants with the water having a stable high nitrate content.

5 Claims, 3 Drawing Sheets

(56) References Cited

U.S. PATENT DOCUMENTS

| | | |
|---|---|---|
| 2010/0000152 A1 | 1/2010 | Shinohara et al. |
| 2011/0126455 A1* | 6/2011 | Shinohara ............... C12N 1/14 |
| | | 435/243 |
| 2012/0297846 A1* | 11/2012 | Lanciault ............... B01D 17/00 |
| | | 71/11 |
| 2017/0107159 A1* | 4/2017 | Hepner ................. C05F 17/964 |

FOREIGN PATENT DOCUMENTS

| | | | | |
|---|---|---|---|---|
| JP | 2015043740 A | | 3/2015 | |
| NL | 2015253 | * | 2/2017 | |
| WO | WO0215945 A1 | | 2/2002 | |
| WO | WO-2017021415 A1 | * | 2/2017 | ............. C02F 11/02 |

OTHER PUBLICATIONS

Guillen-Jimenez, E., et al. "Bio-mineralization of organic matter in dairy wastewater, as affected by pH. The evolution of ammonium and phosphates." Water Research 34.4 (2000): 1215-1224. (Year: 2000).*

Database WPI, Week 201522, Thomson Scientific, London, GB; AN 2015-17815E, XP002796345.

* cited by examiner

METHOD AND SYSTEM FOR PROVIDING PLANTS WITH WATER COMPRISING A HIGH NITRATE CONTENT

The present invention relates to a method for producing water having a stable high nitrate content, an organic fertilizer comprising the water having a stable high nitrate content thus produced, and use of the water having a stable high nitrate content in a method for the organic cultivating of a plant in a substrate. The present invention further relates to a continuous flow system for supplying plants with the water having a stable high nitrate content.

Plants require several nutrients to grow, such as nitrogen (N), phosphorus (P), potassium (K), calcium (Ca), sulphur (S), magnesium (Mg), boron (B), chlorine (Cl), manganese (Mn), iron (Fe), zinc (Zn), copper (Cu), and molybdenum (Mo). The nitrogen as present in the atmosphere and as proteins and/or amino acids in plant and animal matter is, however, not available to plants. For nitrogen to be available for uptake by plants it needs to be present in the form of ammonium (NH4+), nitrate ($NO_3^-$) or urea ($NH_2$). Microorganisms, such as fungi and bacteria present in the soil, convert proteins and amino acids into nitrate in a nitrification process.

To provide plants with the optimum growing conditions, plant growers often use fertilizers. These fertilizers do not comprise nitrogen in bio-available form but comprise nitrogen compounds, such as proteins, amino acids, and/or ammonium. Once applied to the soil, these compounds are converted to nitrate by the nitrification process as described above.

In greenhouses, plants are often grown in a substrate above the ground. Several systems for growing plants above the ground are known in the art. A substrate is an artificial plant growing medium, usually composed of coco, white peat, black peat, stone wool, perlite, or combinations thereof. The use of substrates is advantageous as the growing conditions can be fully controlled and it is easy to disinfect the substrate for subsequent use. Furthermore, the incidence of soil-borne diseases and pests, such as for instance *Fusarium* and *Phytopthora*, is greatly reduced.

The substrates on which the plants are grown do however not provide an environment wherein a sufficient amount of nitrogen can be generated. Plant growth on substrates above the ground is therefore still suboptimal. In the research leading to the present invention, a method was developed wherein an organic liquid is produced that has a high nitrate content. The nitrate content achieved with this method is about 8-10 mmol/l. The method is described in PCT patent application no. PCT/EP2016/068446. This method can, however, be further optimized as nitrate may be lost during storage and transportation to the greenhouse. The amount of nitrate actually applied to the plants is therefore less then expected when the organic liquid is not directly used or has to travel a long distance before it reaches the plants. In addition, it appears that organic matter and micro-organisms accumulate in the transport and irrigation systems, thereby blocking the water flow and contaminate the system. It is furthermore not desirable that micro-organisms are supplied to the plants.

It is therefore an object of the present invention to provide a method for producing water with a stable high nitrate content which is suitable for organic cultivation.

The present inventors have developed a method wherein water comprising a high nitrate content is produced in an entirely organic manner. As such, the water with high nitrate content is suitable for use in the organic cultivation of plants, including organic cultivation of plants on a substrate above the ground. With this method, water with any desired nitrate content can be produced. The present inventors have shown that nitrate contents of between 5-200 mmol/l, and even between 15-200 mmol/l, can be achieved. Furthermore, the water having a high nitrate content is stable, which means that no, or minimal amounts of, nitrate is lost during or after the process.

The present invention thus relates to a method for producing water having a stable nitrate content of between 5-200 mmol/l, comprising:
  a) contacting water comprising organic matter having at least 100 ppm ppm of nitrogen compounds with ammonification and nitrifying bacteria to obtain water having a nitrate content of between 5-200 mmol/l;
  b) passing the water obtained in step a) through a membrane to separate organic matter, fungi and/or bacteria from the water; and
  c) optionally collecting the water.

It should be noted that a stable nitrate content means that the nitrate concentration in water is not increasing due to further production of nitrate and not decreasing due to denitrification. The method of the invention thus achieves production of water containing a stable nitrate concentration. The water obtained by this method comprises a nitrate content of between 5-200 mmol/l. In order of increased preference, the nitrate content is between 10-150 mmol/l, between 10-100 mmol/l, between 10-75 mmol/l, between 10-50 mmol/l, between 10-40 mmol/l, between 10-30 mmol/l, between 10-25 mmol/l, between 10-20 mmol/l, between 15-200 mmol/l, between 15-150 mmol/l, between 15-100 mmol/l, between 15-75 mmol/l, between 15-50 mmol/l, between 15-40 mmol/l, between 15-30 mmol/l, between 15-25 mmol/l, between 12-20 mmol/l or between 15-20 mmol/l. The water is further substantially free of organic matter, fungi and/or bacteria. Organic cultivation of plants above the ground requires certain concentrations of mineral salts. No extra mineral salts need to be added to the water comprising the nitrate content to achieve this required concentration of mineral salts, because all required mineral salts are produced from the organic matter by the microorganisms in step a). Mineral salts can for example be calcium nitrate, potassium nitrate, magnesium nitrate, ammonium nitrate, and potassium phosphate. As a first step, water is provided wherein organic matter is added. To be able to monitor the nitrate content, the water to which the organic material is added does not comprise large amounts of nitrate. The organic material is therefore added to fresh water, preferably tap water. The organic matter serves as the source of organic nitrogen, i.e. nitrogen derived from plant and/or animal matter. The nitrogen can for instance be added in the form of ammonium, ammonia, proteins and/or amino acids, which will be converted into nitrate during the method of the present invention. The organic matter can be any organic matter comprising nitrogen compounds, including commercially available organic substances, such as for instance OPF (organic plant feed) from Plant Health Cure or Koppert Biologial Systems, and, optionally pretreated, biomass.

Any desired nitrate content can be obtained depending on the amount of nitrogen present in the organic matter. A nitrate content of at least 5 mmol/l can be obtained when the added organic matter comprises at least 100 ppm of nitrogen. A nitrate content of at least 15 mmol/l can be obtained when the added organic matter comprises at least 210 ppm of nitrogen. A nitrate content of at least 25 mmol/l can be obtained when the added organic matter comprises at least 350 ppm of nitrogen. A nitrate content of at least 50 mmol/l can be obtained when the added organic matter comprises at least 700 of nitrogen. A nitrate content of at least 75 mmol/l can be obtained when the added organic matter comprises at least 1050 ppm of nitrogen. A nitrate content of at least 100 mmol/l can be obtained when the added organic matter comprises at least 1400 ppm of nitrogen. A nitrate content of at least 125 mmol/l can be obtained when the added organic matter comprises at least 1750 ppm of nitrogen. A nitrate content of at least 150 mmol/l can be obtained when the added organic matter comprises at least 2100 ppm of nitrogen. A nitrate content of at least 175 mmol/l can be obtained when the added organic matter comprises at least 2450 ppm of nitrogen. A nitrate content of 200 mmol/l can be obtained when the added organic matter comprises at least 2800 ppm of nitrogen.

It is important that the electric conductivity (EC) of the water comprising the organic matter does not exceed 35 mS/cm, as this may block nitrate production. It is therefore preferred that the water comprising the organic matter in step (a) has an EC of below 35 mS/cm. The EC is the sum of all ions present in the water comprising the organic matter. Because the organic matter provides all of the ions, the EC is therefore dependent on the amount of organic matter present in the water.

The bacteria employed in step (a) comprise ammonification bacteria and nitrifying bacteria. Ammonification bacteria are capable of converting proteins and/or amino acids present in the organic matter into ammonia ($NH_3$) and ammonium ($NH_4^+$). This conversion is also referred to as ammonification or mineralization. Nitrifying bacteria are capable of converting ammonium ($NH_4^+$) into nitrite ($NO_2^-$), and nitrite ($NO_2^-$) into nitrate ($NO_3^-$). These conversions are also referred to as nitrification. Suitable ammonification and nitrifying bacteria are known in the art and are commercially available. Suitable bacteria are for instance *Nitrosomonas* and *Nitrobacter*.

The bacteria may be present as sludge or on biocarriers. If the bacteria are present on biocarriers, the membrane in step b) should be protected, for instance by a screen with pores smaller than the size of the biocarriers.

The pH of the solution in step (a) shall be between 5.0 and 9.0, as the ammonification process performs optimally between a pH of between 7.5 and 9.0 and the nitrification process performs optimally between a pH of between 5.0 and 8.0.

Optimally, the ammonification and nitrification process is performed at a temperature of between 25-30° C.

The mixture in step a) is preferably aerated to maintain the bacterial population and stimulate bacterial growth.

After nitrification, or after the desired nitrate content has been reached, the water comprising high nitrate content, i.e. a nitrate content of between 5-200 mmol/l is passed through a membrane. The membrane serves to remove organic matter and/or micro-organisms, including fungi and bacteria, from the nitrate water. As a result, the water with high nitrate content is substantially free of organic matter, fungi and/or bacteria. This leads to an improved stability of the nitrate content in the water, as there is substantially no organic matter, fungi and/or bacteria present in the nitrate water that can lead to denitrification.

A further advantage of having removed organic matter, fungi, and/or bacteria from the nitrate water is that the means for transferring the nitrate water to its destination, such as for instance a greenhouse, will not get blocked by the remains of the organic matter. Also, no unfavorable fungi and/or bacteria will be provided to the plants irrigated with the nitrate water.

The membrane can be any membrane capable of removing organic matter, fungi, and/or bacteria. Membranes for use in bioreactors are known in the art. Preferably, the membrane has a pore size of between 0.01-1 µm, preferably of between 0.01-0.5, more preferably of between 0.01-0.1 µm, most preferably of about 0.04 µm.

Preferably, the method of the present invention is carried out in a continuous flow system. The continuous flow system comprises a bioreactor as described herein.

The water produced by the method of the present invention has a nitrate content of between 5-200 mmol/l and is substantially free of organic matter, fungi and/or bacteria. No extra mineral salts are added apart from the mineral salts produced from the organic matter used in step (a). It is therefore allowed to be used as an organic fertilizer for organically growing plants. It is especially suitable for the organic cultivation of plants grown in a substrate.

The water produced by the method of the present invention may be directly, as part of a system, applied to plants after dilution with clear water to the demanded conductivity. The water produced by the method of the present invention may also be concentrated to produce a concentrated product, which upon dilution can be used to fertilize plants.

At present, no organic fertilizer exists that has a nitrate content as high as between 12-100 or even 15-200 mmol/l. The present inventors found that such high nitrate content can be achieved by the method of the present invention.

The present invention therefore also relates to an organic fertilizer comprising a nitrate content of between 15-200 mmol/l, which is substantially free of organic matter, fungi and/or bacteria. No extra mineral salts are added besides the mineral salts produced from the organic matter used in step (a) In order of increased preference, the nitrate content of the organic fertilizer of the present invention is between 15-150 mmol/l, between 15-100 mmol/l, between 15-75 mmol/l, between 15-50 mmol/l, between 15-40 mmol/l, between 15-30 mmol/l, between 15-25 mmol/l, or between 15-20 mmol/l.

As described above, the method of the invention produces water with a stable nitrate content. The method of the present invention is therefore suitable for being used as a single process, wherein the water resulting from the method is stored and/or transported and/or applied to plants.

The stability of the nitrate content also allows the method of the present invention to be a continuous process. One aspect of the continuous process is that the water comprising the organic matter in the bioreactor remains at the same level. The production of nitrate by the microorganisms therefore occurs continuously. The continuous process can suitably be used in a continuous flow system.

The present invention therefore also relates to a continuous flow system for supplying plants with water comprising a nitrate content of between 5-200 mmol/l, the system comprising at least one tank for nitrification and a membrane for removing organic matter, fungi and/or bacteria from water. Preferably, the system comprises:
  a) a first tank for providing water comprising organic matter;
  b) a second tank for nitrification; and
  c) optionally a third tank;
wherein the system comprises a membrane, preferably present in the second tank, or third tank when present. In a particular embodiment, the system comprises:
  a) a first tank for providing water comprising organic matter;
  b) a second tank for nitrification;

c) means for transferring the water from the first tank to the second tank;
d) optionally a third tank;
e) means for transferring the water from the second tank to the third tank when a third tank is present; and
f) means for transferring the water from the second tank, or third tank when present, to a storage tank or a destination, wherein the system comprises a membrane, preferably present in the second tank, or third tank when present.

The continuous flow system comprises a bioreactor, which is the second tank for nitrification, or a combination of the first tank and the second tank, or a combination of the second tank and the third tank, or a combination of the first, second and third tank, optionally with the means for transferring the water from one tank to another. The bioreactor is also part of the present invention.

As mentioned, the method of the present invention can be performed using this system. In a first step, water comprising organic matter is contacted with ammonification and nitrifying bacteria to produce water having a nitrate content of between 5-200 mmol/l. This step takes place in the second tank, or also referred to herein as the nitrification tank or bioreactor. The amount of bacteria and the type of bacteria chosen determine how long the nitrification process will take to obtain the desired nitrate content. This can be easily adapted and checked for during the process. For instance, the nitrate content can be measured using a nitrate test strip or by taking a sample of which the exact nitrogen content can be quantified by laboratory methods. If required, the process conditions can be optimized by for instance increasing or decreasing the amount of bacteria, increasing or decreasing the incubation time, gasification, increasing or decreasing the pH, etc. In the next step, the water with a nitrate content of between 5-200 mmol/l is passed through a membrane. This can either take place in the nitrification tank or in a third tank comprising a membrane. This step separates organic matter, fungi, and/or bacteria from the water with high nitrate content.

Subsequently, the water which then comprises a nitrate content of between 5-200 mmol/l and which is substantially free of organic matter, fungi, and/or bacteria, is collected and either stored in a storage tank or transferred to a supply tank or transported to a destination where it is directly supplied to plants. Transferring back to the first tank, the organic matter including the microorganisms results in a decreased residence time of the water in the first tank. A further aspect of the invention is thus that the time the water comprising the organic matter is present in the first tank is between 24 hours and 168 hours, preferably between 30 and 120 hours, more preferably between 36 and 72 hours, even more preferably between 42 and 56 hours, and most preferable 48 hours.

In one embodiment, the system of the present invention does not comprise the third tank comprising a membrane but the membrane is positioned within the second tank or within the means for transferring the water from the second tank to a storage tank or a destination. In the latter option, the organic material, fungi and/or bacteria are removed from the nitrate water on its way from the second tank to the storage tank or destination.

A further aspect of the invention is that after the removal of the organic material, fungi and/or bacteria, the water comprising the nitrate content can be maintained in an anaerobic environment. Because the microorganisms responsible for the production of nitrate are removed, the nitrate concentration does not further increase. Moreover, the water comprising the desired nitrate content is not preferably aerated anymore because the microorganisms are removed. Also, substantially no denitrification occurs after removal of the microorganisms. Therefore, there is no need anymore to aerate the water comprising the nitrate content.

At a certain stage, the organic waste, fungi and/or bacteria captured by the membrane needs to be removed from the membrane or the membrane needs to be replaced by a clean membrane. The system can therefore further comprise a dewatering system (sludge dewatering) means for removing organic matter, fungi and/or bacteria from the membrane. The removed organic matter may still comprise useful nitrogen and/or other nutrients which can be used again in the method of the present invention. Also, the removed bacteria can be reused in the method of the present invention. The system can therefore further comprise means for transferring the removed organic matter to the first tank or nitrification tank, and/or means for transferring the removed bacteria to the nitrification tank.

The water as obtained after passing through the membrane can subsequently be stored in a separate storage tank or can be directly transported to a supply tank or destination. The destination is for instance a greenhouse or field where plants are grown. It can also be a hydroponics system.

The water resulting from the method of the present invention is then used to irrigate plants. As such, the plants receive the water and nitrate required for growth. Other nutrients required for plant growth may be added to the plants separately or added to the water at any stage during the method of the present invention. It can also be already present in the starting water, organic matter used as nitrogen source, and/or in the soil or substrate wherein the plants are grown.

Water and nutrients are usually provided in excess to growing plants. The plants will not absorb all water and nutrients provided to them, which are drained off as waste water. This waste water and nutrients can be used again in the method of the present invention. The system can therefore further comprise means for transferring waste water from the destination to the first or second tank.

The water resulting from the method of the present invention can also be processed in order to manufacture a concentrated product. Plant growers only need to dilute the product in water in order to use it as irrigation water or fertilizer in their irrigation or plant growing system.

The present invention therefore also relates to a method for the organic cultivation of a plant on a substrate, comprising watering the plant with water comprising a nitrate content of between 15-200 mmol/l. No extra mineral salt is added besides the mineral salts produced from the organic matter used in step (a). Preferably, the water is also substantially free of organic matter, fungi and/or bacteria.

The present invention also relates to a method for the organic cultivation of a plant on a substrate, comprising:
a) diluting the organic fertilizer of the present invention in water to obtain water comprising a nitrate content of between 5-200 mmol/l; and
b) watering the plant with the diluted organic fertilizer.

In both methods, the nitrate content of the water may be, in order of increased preference, 10-150 mmol/l, between 10-100 mmol/l, between 10-75 mmol/l, between 10-50 mmol/l, between 10-40 mmol/l, between 10-30 mmol/l, between 10-25 mmol/l, between 10-20 mmol/l, between 15-150 mmol/l, between 15-100 mmol/l, between 15-75 mmol/l, between 15-50 mmol/l, between 15-40 mmol/l, between 15-30 mmol/l, between 15-25 mmol/l, or between 15-20 mmol/l.

Both methods lead to an increase in the yield of vegetable plants, in particular pepper, or sweet bell pepper, and tomato plants, as compared to the yield obtained after irrigation with water not comprising a nitrate content of between 5-200 mmol/l. Specifically, a yield of at least 25 kg/m², in particular at least 30 kg/m², sweet bell peppers is obtained after 44 weeks of cultivation under normal growing conditions. Normal growing conditions include for instance an average day temperature of 20.5° C., a humidity of 70%, and a watering frequency of 120 cc per 150 joules of sun irradiation, in a greenhouse. A yield of at least 50 kg/m², in particular at least 55 kg/m², tomato fruits is obtained after 44 weeks of cultivation under normal growing conditions. Normal growing conditions include for instance an average day temperature of 19° C., a humidity of 70%, and a watering frequency of 120 cc per 150 joules of sun irradiation, in a greenhouse.

The present invention therefore also relates to a method for increasing the yield of organically cultivated vegetable plants grown on a substrate by using the water produced by the method of the present invention.

The vegetable plant may be any vegetable plant, but is preferably selected from the group consisting of *Capsicum annuum, Cucumis sativus, Solanum melongena* and *Solanum lycopersicum*.

"Organic" or "organic matter" as used in the context of the present invention refers to materials derived from plant and/or animal matter. As such, the organic matter and its derivatives are allowed to be used in the organic cultivation of plants.

"Nitrification" used in the context of the present invention refers to both the oxidation of ammonia to nitrite and the oxidation of nitrite to nitrate.

"High nitrate content" in the context of the present invention refers to a nitrate content of between 5-200 mmol/l. The terms "water having a high nitrate content" and "nitrate water" thus refer to water comprising a nitrate content of between 15-200 mmol/l.

Anywhere in the present description where it is referred to a nitrate content of between 5-200 mmol/l, this can be replaced with a nitrate content of between 10-200 mmol/l, 15-200 mmol/l, 20-200 mmol/l, 25-200 mmol/l, 50-200 mmol/l, 5-150 mmol/l, 10-150 mmol/l, 15-150 mmol/l, 20-150, 25-150 mmol/l, 50-150 mmol/l, 5-100 mmol/l, 15-100 mmol/l, 20-100 mmol/l, 25-100 mmol/l, 50-100 mmol/l, 5-75 mmol/l, 10-75 mmol/l, 15-75 mmol/l, 20-75 mmol/l, 25-75 mmol/l, 50-75 mmol/l, 5-50 mmol/l, 10-50 mmol/l, 15-50 mmol/l, 20-50 mmol/l, 25-50 mmol/l, 5-40 mmol/l, 10-40 mmol/l, 15-40 mmol/l, 20-40 mmol/l, 25-40 mmol/l, 30-40 mmol/l, 5-30 mmol/l, 10-30 mmol/l, 15-30 mmol/l, 20-30 mmol/l, 25-30 mmol/l, 5-25 mmol/l, 10-25 mmol/l, 15-25 mmol/l, 20-25 mmol/l, 25 mmol/l, 5-20 mmol/l, 10-20 mmol/l, 15-20 mmol/l, 20 mmol/l, or 15 mmol/l.

A "stable nitrate content" means that the nitrate content in the water after passage through the membrane does not differ more than 20%, preferably 10%, more preferably 5%, 1% or 0.1%, even more preferably not more than 0.01%, from the nitrate content in the water after storage and/or when it is applied to the plants, i.e. in the irrigation water. To determine this %, the following formula can be used:

100—nitrate content of water in storage tank or transport system or supply tank×100%=% difference nitrate content of water in collection tank "Substantially free of organic matter, fungi and/or bacteria" means that the water has a COD lower than 20, less than 400 CFU/ml bacteria, and/or less than 200 CFU/ml yeast and fungi.

The term "plants grown on a substrate" refers to the practice of cultivating plants above the ground, i.e. not grown in the field. "Substrate" in this context refers to artificial growth media, such as for instance plugs and pressed pots. Such artificial growth media may comprise a certain amount of soil.

The term "tank" also encompasses a "container" or other type of housing that is suitable for containing water. The "second tank" is also referred to herein as the "nitrification tank" or "bioreactor".

The present invention will be further illustrated in the Examples that follow and that are for illustration purposes only. The Examples are not intended to limit the invention in any way. In the Examples and the application reference is made to the following figures.

EXAMPLES

Example 1—The Nitrate Content Remains Stable After 1 Week of Storage

Irrigation water for growing sweet bell pepper plants and tomato plants was produced in a bioreactor designed and developed by the present inventors. This bioreactor provides a continuous flow system for producing water with a stable high nitrate content. It comprises three tanks: one tank into which an organic fertilizer mixture is provided, one tank in which the organic nitrogen from proteins in the organic fertilizer mixture is converted into $NO_3^-$ nitrogen (nitrate), and one tank in which the mixture is passed through a membrane. The resulting water has a high nitrate content and is substantially free of organic matter, fungi and bacteria. It also does not contain calcium nitrate, potassium nitrate, magnesium nitrate, ammonium nitrate, or potassium phosphate.

In a first step, 6 liters per m³ water comprising about 297 ppm nitrogen was provided in the first tank. This solution was transferred to a second tank comprising ammonification and nitrifying bacteria. The second tank is in connection with a third tank comprising a 0.04 μm membrane. After a minimum residence time of 24 hours, the mixture in the second tank is transferred to the third tank, where it is passed though the membrane. The resulting water was collected and a sample thereof directly analyzed. Another sample in which the nitrate content was measured was taken after 1 week of storage. The results are presented in Table 1.

TABLE 1

Analysis of composition of water produced via continuous flow system (directly after collection of water from tank 3 and after 1 week of storage. Converted results: ppm = mg/l and ppb = µg/l.

|  | Water directly after process | | Water after 1 week of storage | |
|---|---|---|---|---|
| pH | 7.4 | | 7.2 | |
| EC mS/cm 25° C. | 2.0 | | 2.1 | |
| Cations: | mmol/l | ppm | mmol/l | ppm |
| $NH_4$ | 1.6 | 29 | 2.0 | 36 |
| K | 4.9 | 192 | 5.0 | 196 |
| Na | 1.1 | 25 | 1.2 | 28 |
| Ca | 4.4 | 176 | 4.1 | 164 |
| Mg | 1.1 | 27 | 1.1 | 27 |
| Anions: | mmol/l | ppm | mmol/l | ppm |
| $NO_3$ | 12.0 | 744 | 10.8 | 670 |
| Cl | 1.0 | 35 | 0.9 | 32 |
| S | 1.2 | 38 | 1.1 | 35 |
| $HCO_3$ | 2.0 | 122 | 3.6 | 220 |
| P | 0.67 | 21 | 0.68 | 21 |
| Micronutrients: | µmol/l | ppb | µmol/l | ppb |
| Fe | 27 | 1508 | 22 | 1229 |
| Mn | 12 | 659 | 11 | 604 |
| Zn | 3.5 | 229 | 305 | 229 |
| B | 75 | 811 | 72 | 778 |
| Cu | 0.6 | 38 | 0.6 | 38 |
| Mo | 1.4 | 134 | 1.4 | 134 |
| Si (mmol/l; ppm) | <0.01 | <0.3 | <0.01 | <0.3 |

Example 2—Use of the Water Comprising Stable High Nitrate Content for Growing Pepper and Tomato Plants The collected water from Example 1 was enriched with micronutrients as desired, as well as extra magnesium sulfate or potassium sulfate. These are minerals from earth and allowed in organic cultivation. After adding nutrients, the water was diluted to the demanded conductivity specific to the crop, which is 2.6 mS/cm for pepper and 3 mS/cm for tomato. It was subsequently transported through an irrigation system to the greenhouse where sweet bell pepper plants of the orange pepper variety "Orbit" and tomato plants of the variety "Completo" grafted onto an estamino understem were grown in coco substrates under normal growing conditions. The sweet bell pepper plants were grown in a density of 2.2 plants/m², the tomato plants in a density of 1.45 plants/m². The plants were irrigated as usual. A sample of the irrigation water was taken and analyzed. The results are presented in Table 2.

Figure 1:
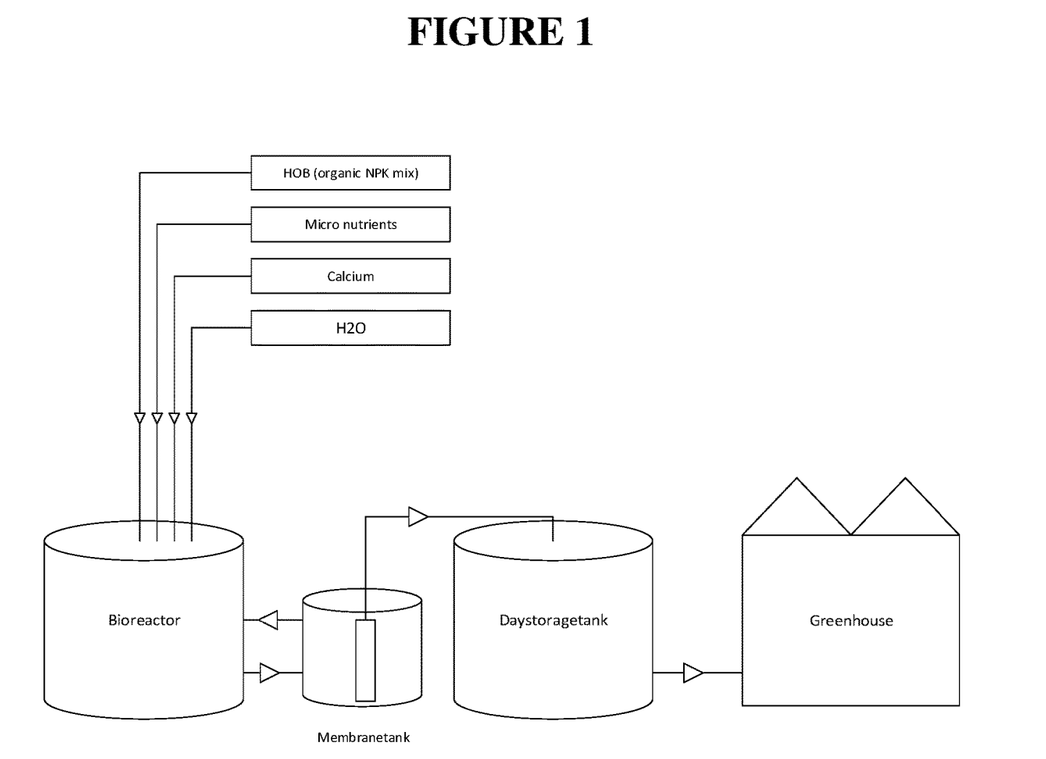
FIG. 1 is a schematic overview of one embodiment of the continuous flow system of the present invention. In this one, non-limiting, example, organic matter in the form of HOB, together with micronutrients, calcium and water, are added to a bioreactor where nitrification takes place. The bioreactor is in connection with a membrane tank in which the water from the bioreactor is passed through a membrane. Water from the membrane tank can flow back to the bioreactor or is transferred to a day storage tank. Water from the day storage tank is transferred to the greenhouse.
Figure 2:
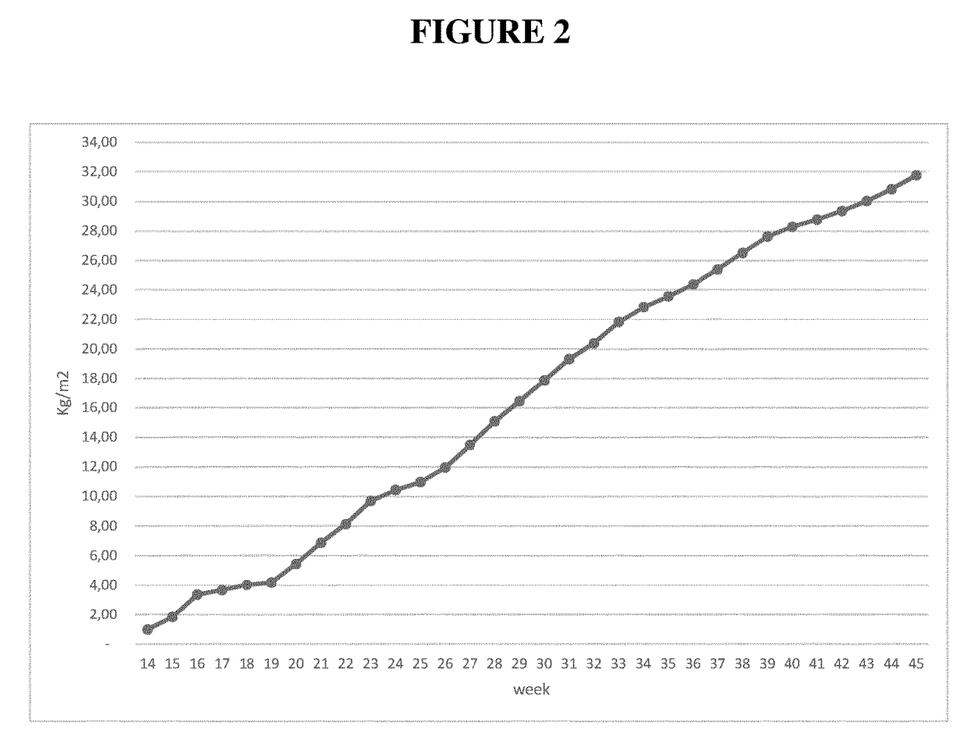
FIG. 2 is a graph that shows the yield of sweet bell pepper plants after irrigation with water produced according to the method of the present invention. After 44 weeks of cultivation, the yield was about 32 kg/m².
Figure 3:
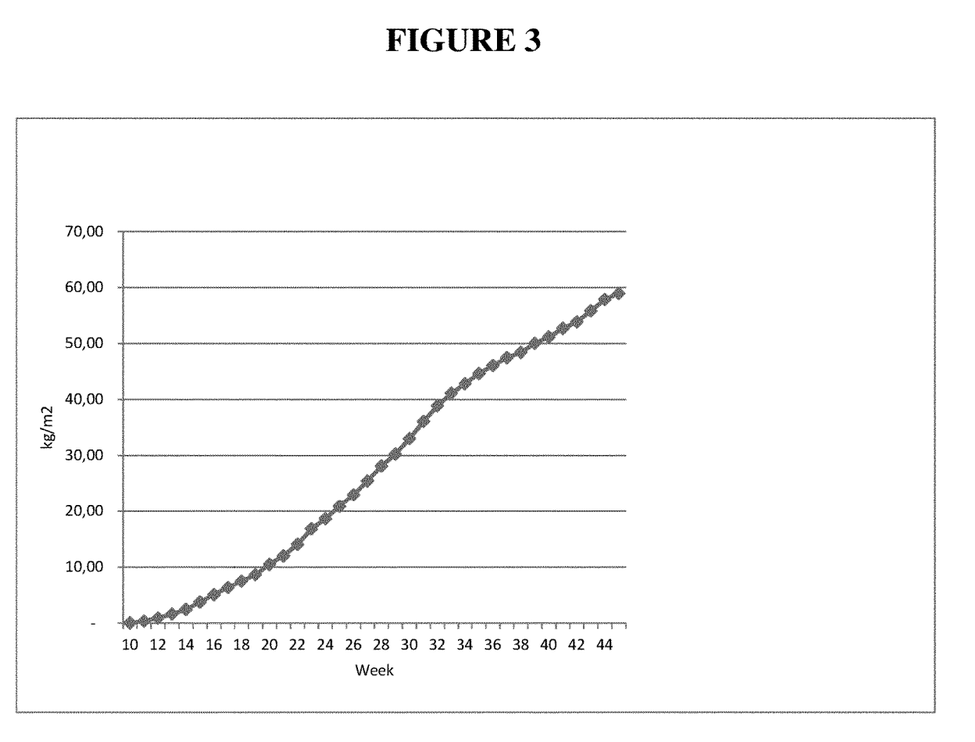
FIG. 3 is a graph that shows the yield of tomato plants after irrigation with water produced according to the method of the present invention. After 44 weeks of cultivation, the yield was about 59 kg/m².

The yield of sweet bell pepper plants is shown in FIG. 2. The yield of tomato plants is shown in FIG. 3.

These yields are comparable to conventional growing with mineral fertilizers, and are clearly increased with respect to the yields obtained by irrigating the plants with water that has not been passed through a membrane.

TABLE 2

Analysis of composition of water produced via continuous flow system. (1) sample taken directly after collection of water from tank 3. (2) sample taken from irrigation water.
Converted results: ppm = mg/l and ppb = µg/l.

|  | Water directly after process (1) | | Water used for irrigation of weet bell pepper (2) | | Water used for irrigation of tomato (2) | |
|---|---|---|---|---|---|---|
| pH | 6.2 | | 6.1 | | 6.3 | |
| EC mS/cm 25° C. | 3.2 | | 2.8 | | 3.1 | |
| Cations: | mmol/l | ppm | mmol/l | ppm | mmol/l | ppm |
| $NH_4$ | 0.5 | 9.0 | 0.2 | 3.6 | 0.1 | 1.8 |
| K | 7.2 | 282 | 6.6 | 258 | 9.8 | 383 |
| Na | 2.2 | 51 | 2.4 | 55 | 2.4 | 55 |
| Ca | 7.6 | 305 | 7.2 | 289 | 6.7 | 269 |
| Mg | 2.4 | 58 | 3.2 | 78 | 3.8 | 92 |
| Anions: | mmol/l | ppm | mmol/l | ppm | mmol/l | ppm |
| $NO_3$ | 21.9 | 1358 | 17.6 | 1091 | 16.7 | 1035 |
| Cl | 2.1 | 74 | 1.8 | 64 | 1.9 | 67 |
| S | 2.7 | 87 | 4.3 | 138 | 6.8 | 218 |
| $HCO_3$ | <0.1 | <6.2 | <0.1 | <6.2 | <0.1 | <6.2 |
| P | 1.31 | 41 | 0.70 | 22 | 0.68 | 21 |
| Micronutrients: | µmol/l | ppb | µmol/l | ppb | µmol/l | ppb |
| Fe | 60 | 3351 | 142 | 7930 | 126 | 7037 |
| Mn | 20 | 1099 | 33 | 1813 | 25 | 1373 |
| Zn | 12 | 784 | 15 | 981 | 15 | 981 |
| B | 96 | 1038 | 107 | 1157 | 105 | 1135 |
| Cu | 0.9 | 57 | 1.3 | 83 | 1.0 | 64 |
| Mo | 1.1 | 106 | 1.6 | 154 | 1.2 | 115 |
| Si (mmol/l; ppm) | 0.03 | 0.8 | <0.01 | <0.3 | <0.01 | <0.3 |

The invention claimed is:

1. A method for producing water having a stable nitrate content of between 10-200 mmol/l in a continuous flow system, the method comprising:
   a) contacting water comprising organic matter having at least 100 ppm of nitrogen compounds with ammonification and nitrifying bacteria to obtain water having a nitrate content of between 10-200 mmol/l;
   b) passing the water obtained in step a) through a membrane to separate organic matter, fungi, and/or bacteria from the water, wherein the membrane has a pore size of between 0.01-0.1 µm; and
   c) optionally collecting the water, which has a stable nitrate content of between 10-200 mmol/l and which is substantially free of organic matter, fungi, and/or bacteria,
   wherein no extra mineral salt is added to the water, wherein the stable nitrate content is the result of the step of passing the water through the membrane, and wherein the nitrate content of the water is stable for at least one week, and
   wherein the continuous flow system comprises a bioreactor in which both ammonification and nitrifying bacteria are employed and wherein the bioreactor comprises the membrane to separate organic matter, fungi, and/or bacteria from the water.

2. The method as claimed in claim 1, wherein step a) is performed at a pH of between 5.0-9.0.

3. The method as claimed in claim 1, wherein the membrane has a pore size of 0.04 µm.

4. The method as claimed in claim 1, wherein the water comprising organic matter is in the bioreactor for a minimum of 24 hours.

5. The method as claimed in claim 1, wherein the water comprising organic matter is in the bioreactor between 24 and 48 hours.

\* \* \* \* \*